United States Patent Office 3,509,705
Patented May 5, 1970

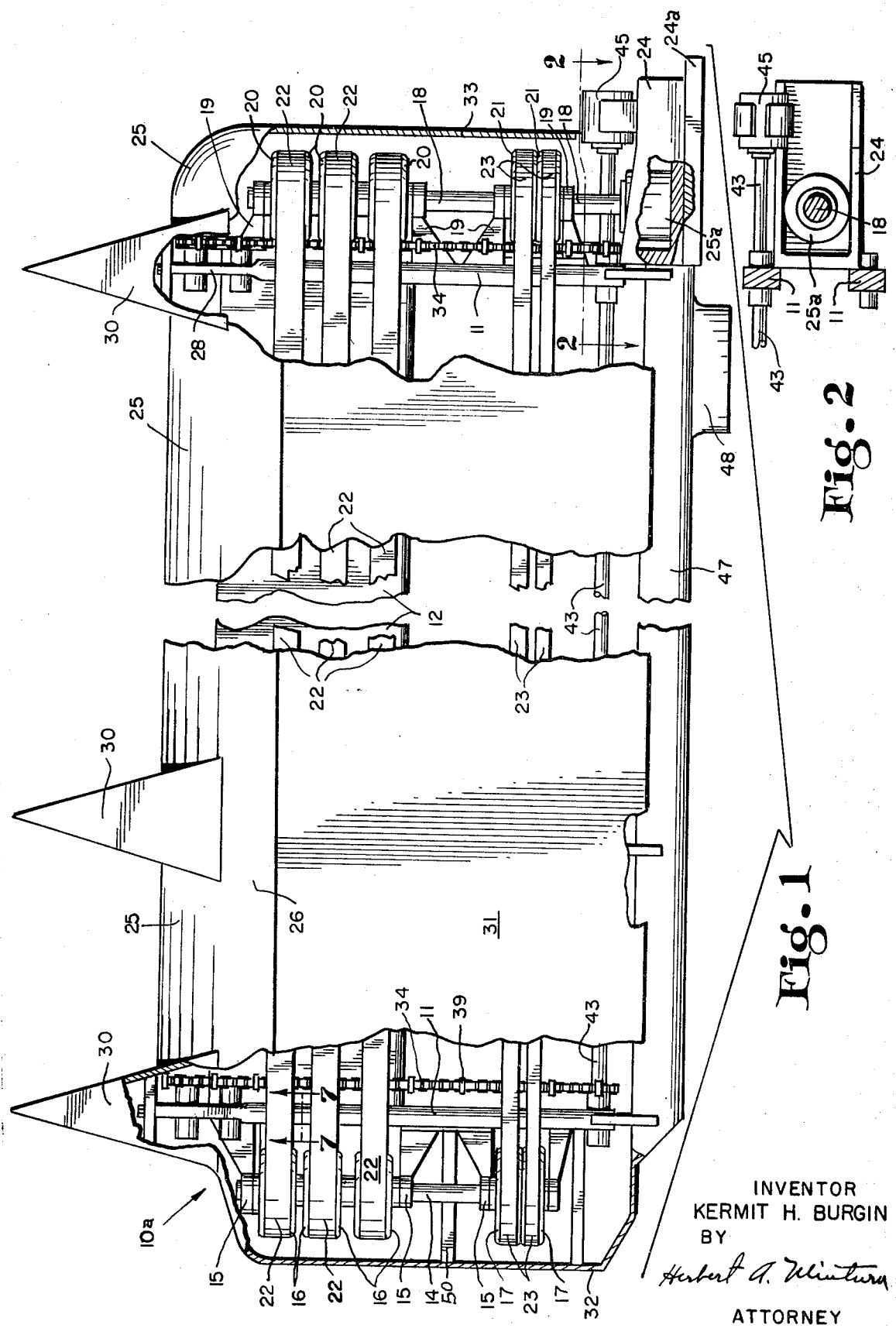

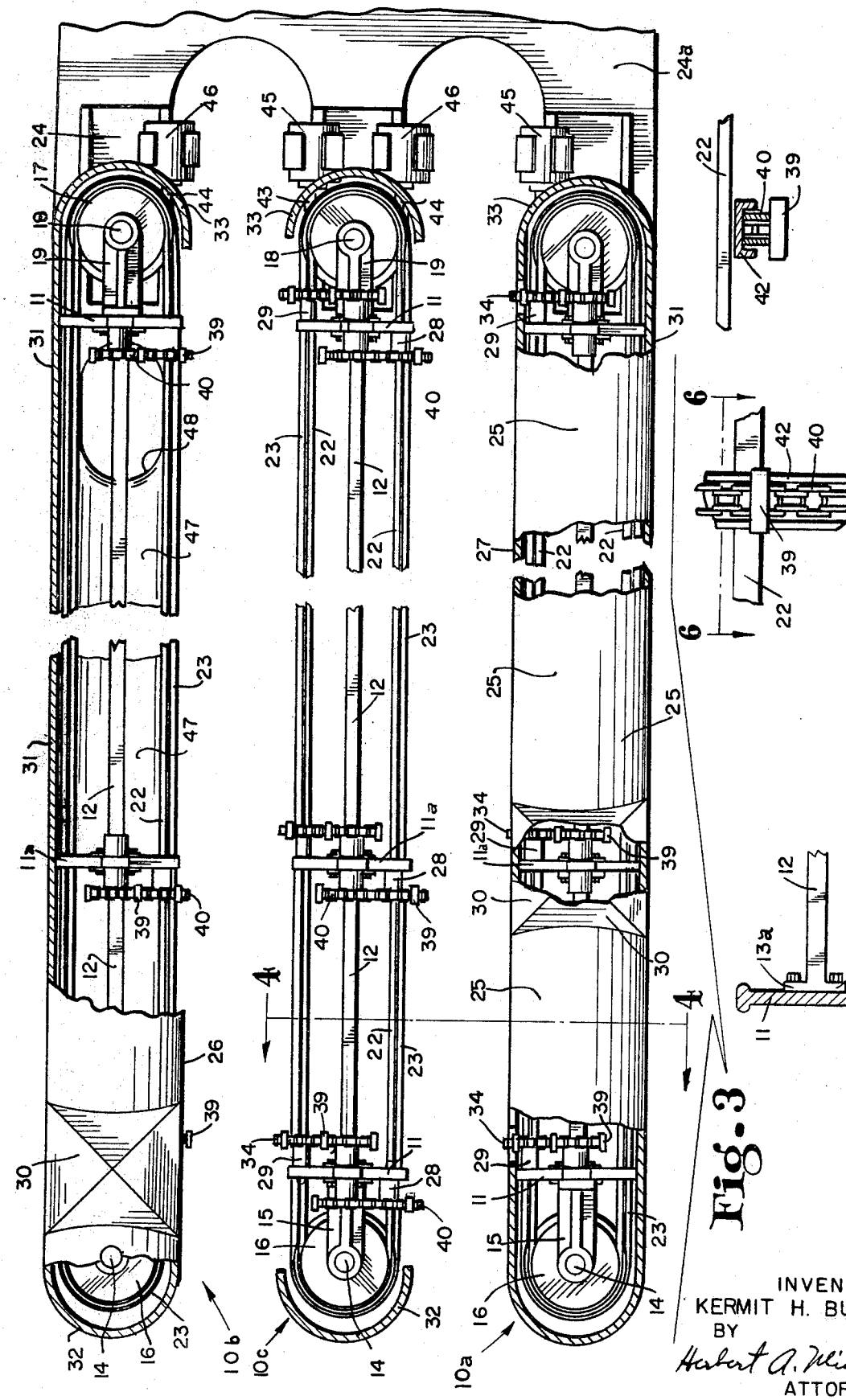

3,509,705
VERTICALLY RISING BRANCH SEPARATOR AND FRUIT PICKER
Kermit H. Burgin, Box 212, R.R. 1,
Whitestown, Ind. 46075
Filed Apr. 8, 1968, Ser. No. 719,460
Int. Cl. A01g *19/08*
U.S. Cl. 56—328                                      9 Claims

ABSTRACT OF THE DISCLOSURE

A fruit picker having vertically stacked pairs of endless belts, each pair approximately horizontally disposed one belt flight opposite one another and spaced apart to form a channel to receive fruit and branches therethrough from upper belt edges; a plurality of chains directed downwardly on each side of the channel and across the opposing faces of the belt flights for slower speeds than that of the belts; and cleats on the chains engaging the branches; and a series of spires along the top edges of the channel to divide branches upon movement upwardly of the picker through a tree.

---

Reference is made to my previous applications for U.S. patents identified as follows: Citrus Fruit Picker, Ser. No. 556,317, now Patent 3,411,280 filed June 9, 1966; Citrus Fruit Harvester, Ser. No. 629,768, now Patent 3,395,523 filed Apr. 10, 1967; and Branch Separator and Fruit Picker, Ser. No. 657,834, now Patent 3,387,443, filed Aug. 2, 1967.

This invention involves a device not only for picking fruits, such for one example as oranges, but moving the device approximately vertically upwardly through the foliage of the tree.

It is well known that oranges particularly require a quick, limited twist of the supporting stems and a substantially simultaneous down pull to separate the oranges from the stems in the absence of damage to the orange. Too slow a twist of the stems results in twisting objectionably long lengths of those stems.

Orange trees grow with a dense mat of intercrossing twigs and branches from which hang oranges singly and in clusters. This gives rise to the problem of entering a picking device through this mat and picking the fruit which hangs not only on outer portions thereof but also back, inwardly in irregular spacing as to horizontal and vertical locations. Therefore, to be most effective, the picker device must be entered under the tree's lowermost branches and then pushed upwardly against and between the succeeding branches, of the mat; combing them apart, much as in combing and parting hair, dividing the branches into quite narrow unrolled windrows and carrying the oranges therealong through narrow, belt channels of widths not exceeding the diameters plus something less than an inch of the largest oranges to be picked. These channel widths are defined by the distance between opposing flights of belts.

On each side of the channel, at the uppermost portions thereof, are mounted a plurality of highly peaked spires as branch dividers, such as pyramids, readily inserted upwardly between branches, gently urging them slight distances laterally. These pyramids are spaced rather closely apart along the channel such as from seven to ten inches. As these pyramids are lifted, the windrows are formed and chains carrying attached, closely spaced cleats, are directed laterally and downwardly from upper side portion of the channel entering the channel from under the pyramids to move in close proximity to the opposing belts.

This sets up a combination of movements, first of the upward travel of the belted walled, open bottom channel, and, secondly, the down travel of the chains. The result is that orange bearing branches together with non-bearing branches are relatively carried in their continuously forming windrow downwardly, in which travel, oranges contacting the belts on either side are whirled, twisted and carried downwardly to fly off into a receptacle spaced below and laterally of the belts and the branches discharge from the lower open side of the channel without any serious damage to the leaves, twigs and branches of the tree.

The invention may be incorporated in structures having varying dimensions, details, and materials. Hence, one particular form of the invention without limitation precisely thereto, is selected in a presently preferred assembly for the purpose of illustration is shown in the accompanying drawings, in which FIG. 1 is a view of a picker head in side elevation and in partial section, with portions of a branch fender carried on an outer side;

FIG. 2 is a detail in section on the line 2—2 in FIG. 1;

FIG. 3 is a view in top plan of a picking unit employing three heads with two intervening channels, and with the branch shielding partially in section and portions omitted;

FIG. 5 is a detail in outside side elevation showing a chain back-trough for protecting belts;

FIG. 6 is a detail in transverse section on the line 6—6 in FIG. 5; and

FIG. 7 is a detail in section on the line 7—7 in FIG. 1 of a bent of the frame work of the picker head.

Figure 4:
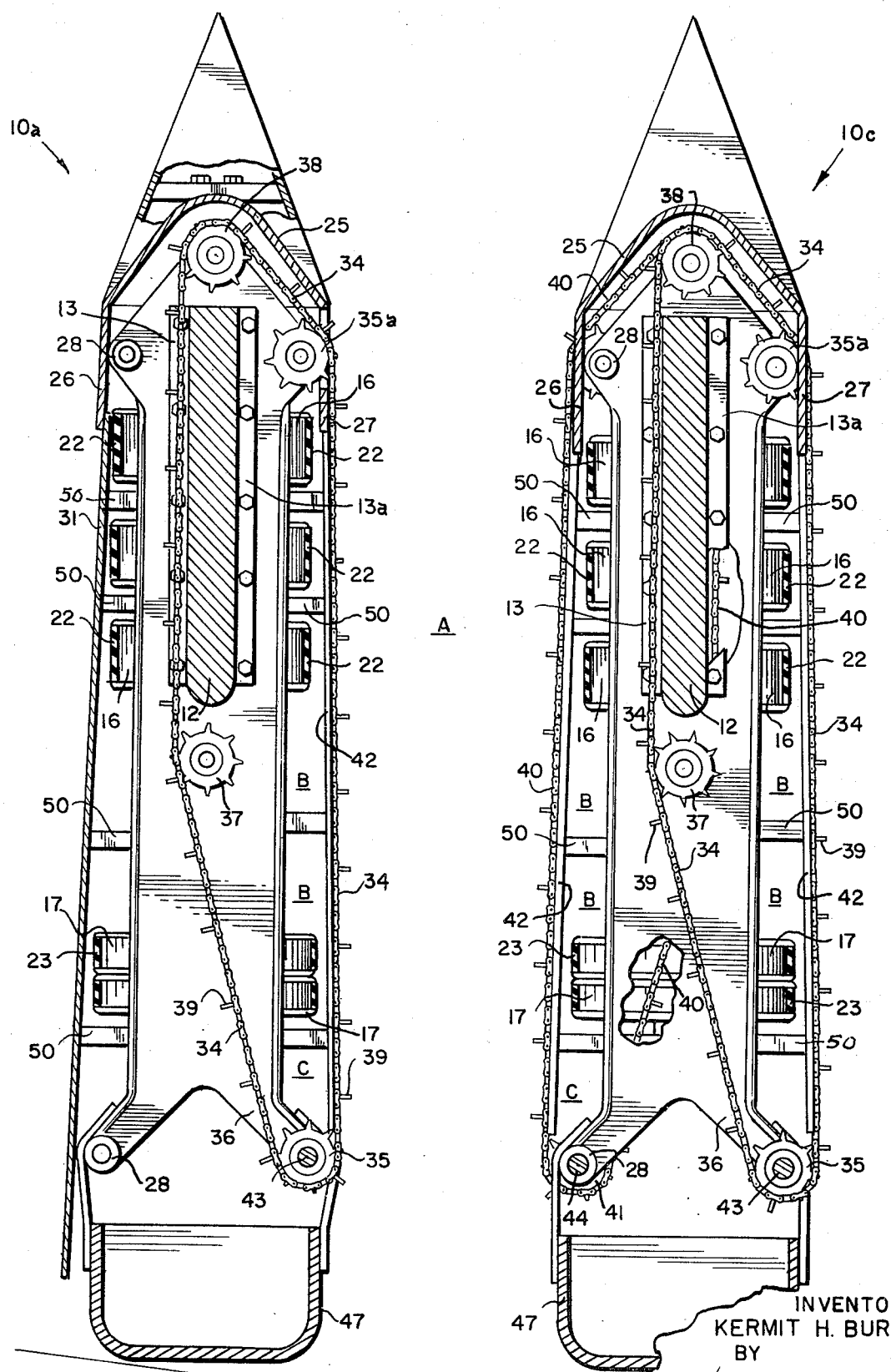
FIG. 4 is a view on an enlarged scale on the line 4—4 in FIG. 1, through two picking heads.

A number of picker heads each generally designated by the numerals 10a, 10b and 10c, form a picker unit. Three heads form a convenient size but preferably does not have more than four whereby a path to be traversed by the overall picker unit through a tree in each of a number of passes therethrough has a width permitting ready vertical travel without such force as would break or otherwise damage the tree branches. As shown in FIG. 3 of the drawings, the picking unit embodies these three heads.

Each head 10 is built upon an elongated framework of a plurality of bents 11 spaced apart in line by intervening plate-like beams 12, one beam between bents 11. A beam 12 is positioned to have its depth vertically disposed and to have one end secured to one bent 11 centrally intermediate the bent edges, and the other beam end likewise to the next bent 11a, FIG. 3. The securing means may be as desired, the essential requirement being that a rigid non-twisting interconnection with suitable bent spacing be had. One such interconnection is shown as comprising flanges 13 and 13a turned from ends of the beams 12 to abut the bents and having bolts or cap screws through these flanges and engaging the bent opposing faces, FIG. 4. Each bent is essentially a vertically disposed plate. The head 10 may be varied in length depending upon the number of bents and beams employed. A length readily handled is approximately thirty to thirty-two inches which is sufficient to reach oranges in their normal positions over the trees without carrying the picker unit inwardly of the tree to the branching of the heavier limbs.

On the left hand face of an end bent 11, a vertically disposed rotating shaft 14 is supported by bearings 15 secured to the bent, FIGS. 1 and 3. A plurality of belt pulleys 16, here shown as three, is fixed along the upper portion of the shaft 14. A plurality of belt pulleys 17, shown as two in number, are fixed to the lower portion of the shaft 14.

In like manner, on the right hand face of the right hand end bent 11, a vertically disposed shaft 18 is carried by bearings 19. Pulleys 20, three in number, are fixed to the upper portion of the shaft 18. Pulleys 21, two in number, are fixed to the lower portion of the shaft 18.

The numbers of the pulleys, both upper and lower may vary depending upon widths employed. Upper belts 22 and lower belts 23 respectievly are trained around the upper pulleys 16, 20 and lower pulleys 17, 21.

A head carrying bracket 24 is attached to the lower end portion of the right hand bent 11 to support the head 10 in cantilever fashion. In turn, the bracket 24 is attached to a base 24a mounted on a tractor boom (not shown). A motor 25a, such as a hydraulic motor, is mounted on the bracket 24 and is connected in driving manner to the lower end of the shaft 18 as means for rotating the shaft 18 to drive the various belts simultaneously.

All of the belts 22 and 23 pass the bents 11 outside of the lateral edges of the bents.

The mechanism so far described will pick oranges if only the branches would not be interfering and it is a primary object of this present invention to divide gently the branches into narrow, loose bundles, above referred to as windrows.

For this purpose, each head 10 is provided with branch shielding sufficient to keep branches from entering between laterally disposed belt flights. A top cover of rigid nature and generally designated by the numeral 25 is fixed across and above the top ends of the bents and rounds down to lap by aprons 26 and 27 in spaced relation over the top edge on each flight of the uppermost belt 22. In the one form shown, the cover 25 is secured by any suitable means (not shown) to laterally projecting bosses 28 and 29 of the bent 11.

A spire 30, FIG. 1, is mounted on the cover or roof 25 above each bent 11. Each spire is a steeply tapering roof construction. Normally, these spires will be centered apart seven to ten inches with short extents of the roof cover 25 therebetween, FIG. 1. The outer heads 10a and 10b each have on its outer side a branch fender wall 31 to prevent engagement of branches with the picker on the outer vertical sides of the outer heads 10a and 10c. Also the front and rear ends of the picker heads 10a, 10b and 10c are each provided with nose shields 32 and 33.

The head 10c has a belt or chain 34, FIG. 4, entrained around a drive sprocket 35 carried on a lower and outwardly extending arm 36 of the bent 11; an idler sprocket 37 to direct the chain 34 to one side along the beam 12 upwardly to a top, central sprocket 38 on a raised end central portion of the bent 11; thence outwardly over sprocket 35a therearound and back down over the right hand outer sides of the belts 22 and 23 to the sprocket 35. The chain 34 is preferably a roller chain. A plurality of cleats 39 are fixed to the chain 34 to project therefrom at spaced intervals of approximately four inches.

In like manner, there is a chain 40, also having cleats 39 fixed thereto, carried on the reverse side of the bent 11 to be driven by a lower sprocket 41, extending upwardly to pass the beam 12 on its reverse side and upwardly over a top sprocket (not shown but of the same size as sprocket 38 and mounted on the bent 11 immediately ahead of that sprocket) and thence outwardly and downwardly through an opening in the apron 26 over the left hand outer sides of the flights of the belts 22 and 23 back to the sprocket 41. Between the chains 34 and 40 and the flights of the belts 22 and 23, are fixed positioned in each instance a trough 42, U-shaped in cross-section, FIGS. 5 and 6. The chains 34 and 40 are withheld from contact with the belt flights by these troughs.

The sprockets 35, one at each bent, are fixed to a shaft 43, and the sprockets 40 also occurring at each but on opposite sides of the bents 11 are secured to a second shaft 44. These two shafts need to be rotated in opposite directions to drive the chains 34 and 40 downwardly over the belt flights. Therefore they may be drivingly interconnected by any suitable means such as by gears (not shown) but where clearance space for a drive is at a premium, the shafts 43 and 44, as shown, may be separately driven by hydraulic motors 45 and 46, FIG. 3.

The head 10a employs but the one set of chains 34 since the outer side of that head is closed over by the fender wall to prevent acceptance of branches and oranges from that side. Thus, the chains 34 of head 10a are in opposition to the chains 40 of the head 10c. The head 10b employs but the one set of chains 40 which are in opposition to the chains 34 of the head 10a since the head 10b has a branch fender wall 31 over its outer side.

An orange receiving receptable 47 extends longitudinally of the under side of each head to be attached to the lower portions of the bents 11. A discharge spout 48, FIG. 1, is provided at one receptacle end.

Operation

The picker unit as described with the three heads is carried under the lowermost branches of the tree to be picked with the heads normally approximately horizontally disposed. The belts and chains are set into motion, the belts with speeds in the neighborhood of two thousand linear feet per minute, and the chains from one to five hundred feet per minute dependent upon the density of the branches.

The unit is slowly raised upwardly (not laterally or radially) to move into the branches. The spires enter between branches to divide them. The heads are but approximately four and a half inches wide, and the channel space A between adjacent heads is approximately four inches wide between belt flights. Branches relatively sliding down the spires concentrate slightly upon entering the space A. The cleats on the chains come from the top sides and enter over branches to aid in moving them through the space A as the unit lifts.

Oranges hanging on the branches come into contact with a belt flight on one side or the other whereupon the orange is whirled at speed sufficient to break its stem. The released orange tends to fly into space downwardly and laterally. The chains extend from the belts somewhat tending to arrest travel of the orange along the belt. The purpose of providing a space B between the upper and lower sets of belts is to provide an exit from between the belts through the space B to allow the orange to drop into the receptacle. Other oranges are doing the same thing. The chains prevent the branches from flopping into this space B.

Some oranges, particularly smaller sized ones, may hang onto the branches and be carried on down to the lower set of belts. These belts are carried on pulleys slightly larger in diameter than the pulleys of the upper belts. Thus, there is a longitudinal top edge of the top belt in this lower group tending to be contacted by the smaller oranges. These smaller ones being sharply twisted and dropped across the lower belts discharge laterally through a lowermost side opening C into the receptacle. In the meantime, branches and twigs are relatively moving on down to be discharged from the underside of the unit without springing back upwardly as the weight of the oranges is released.

The bents are so formed as to their under ends that oranges entering from the spaces B and C between the bents may roll thereunder to the discharge spout.

The unit is moved on upwardly until it emerges from the tree top whereupon it is retracted from the tree, lowered, inserted under the tree, and again raised, and so on until the tree has been picked. A plurality of struts 50 support the belt troughs 42 from the bents 11 and likewise struts 50 support the branch fenders 31.

I claim:
1. In a device for picking fruit from the branches of a tree, the combination with
a pair of upper belts wherein the flight of one belt is approximately horizontally spaced from the flight of another belt;
the space between said belt flights being sufficient to receive maximum size of fruit therethrough;
of a plurality of spire means extending above and spaced along said belt flights to enter between said branches; and
a plurality of endless members having flights entering the upper portion and extending downwardly within said space adjacent opposing belt flights;
means driving said belt flights; and
means driving said endless members.

2. The structure of claim 1, in which said endless members comprise
chains having cleats extending therefrom into said space to engage branches entering the space, tending to drag the branches downwardly and to discharge them from the space.

3. The structure of claim 1 in which there is
a lower pair of belts flights spaced below said upper pair of belt flights a distance sufficient to permit passage of a fruit laterally therebetween; and
said endless members extend across the space between the upper and the lower belt flights.

4. The structure of claim 3, in which there is
a trough between all of said belt flights and said endless members protecting said belt flights from rubbing on said endless members; and
a plurality of cleats spaced along said members and extending beyond said troughs.

5. The structure of claim 4 in which
said endless members enter said horizontal spacing between the upper belt flights from over the top edges of those upper belts; and there is
an upper belt cover between said spires through which cover the endless members emerge.

6. The structure of claim 1 in which there is a first frame comprising
a plurality of frame members;
a horizontally disposed spacer member between and rigidly interconnected to said frame members;
belt pulleys rotatably carried on outer faces of end frame members, and around which said belts are trained to have said flights thereof on outer sides of said frame members; and a
second frame constructed as said first frame;
said belt pairs in each instance consisting of one belt on the first frame and another belt on the second frame presenting flights on opposing sides of the frames;
said spire members being carried by said frame members; and
said two frames being fixed in laterally spaced relation by common ends to a supporting member, thereby determining the horizontal space between said belt flights.

7. The structure of claim 3, in which the horizontal space between said upper belt flights is greater than is the horizontal space between said lower pair of belt flights.

8. The structure of claim 6, in which said endless members consist of
a plurality of endless chains which are carried by said frame members to travel by a flight upwardly thereon and thence over uppermost belt flights downwardly in said horizontal space adjacent those flights and around and under the lowermost flights back to said frame member.

9. The structure of claim 8, in which
chain troughs are fixed to said frame members to be in said horizontal space in close proximity to said belt flights and to withhold said chains from contact with the belt flights; and
said troughs and chains also serving to interrupt travel of fruit along said belt flights.

References Cited

UNITED STATES PATENTS

| | | | |
|---|---|---|---|
| 2,968,141 | 1/1961 | McGough | 56—332 |
| 3,143,844 | 8/1964 | Polk | 56—328 |
| 3,161,007 | 12/1964 | Bergquist | 56—332 |
| 3,412,542 | 11/1968 | Kenton | 56—328 |

RUSSELL R. KINSEY, Primary Examiner